Patented Sept. 26, 1933

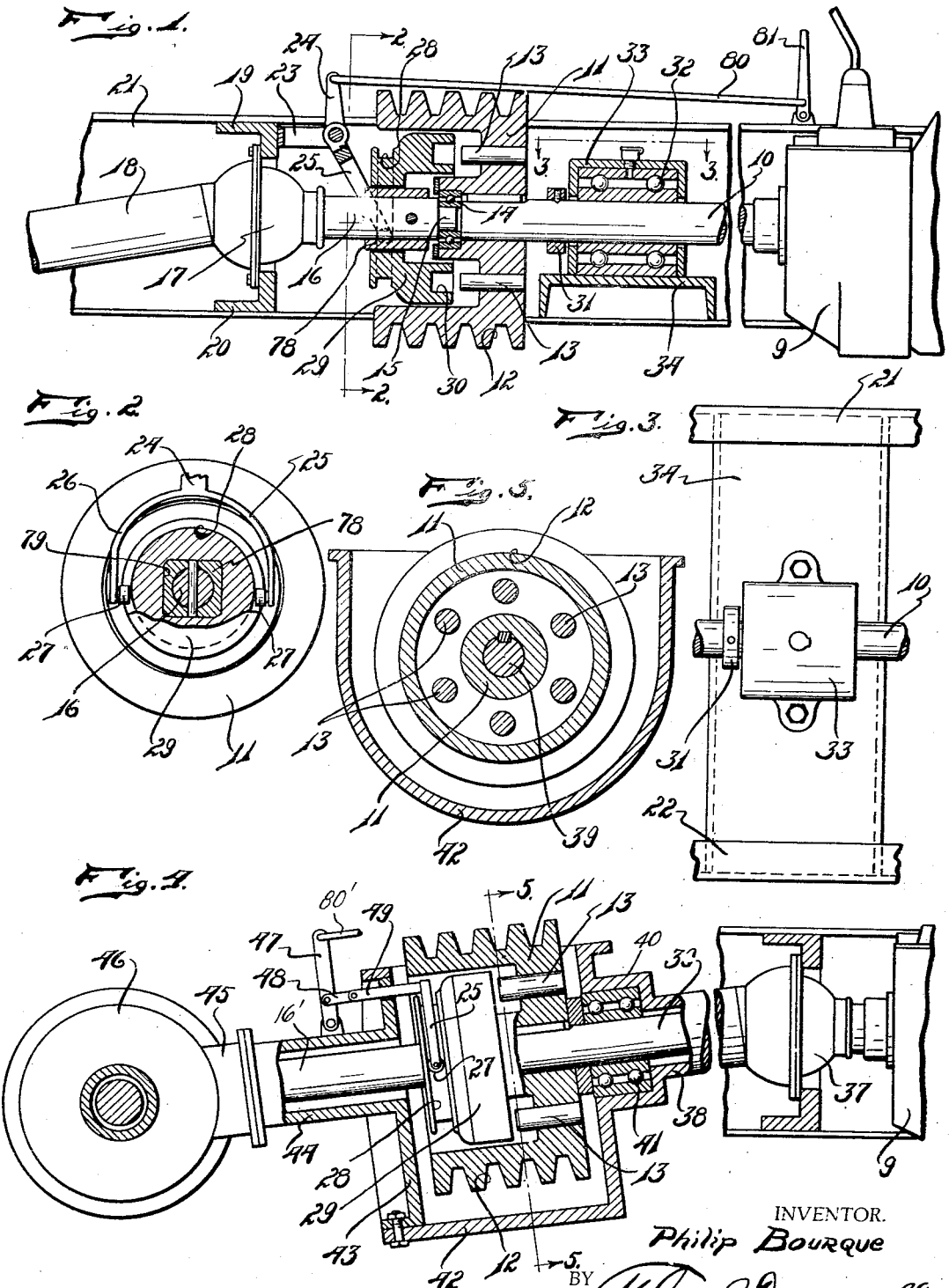

1,927,866

UNITED STATES PATENT OFFICE 1,927,866

POWER TAKE-OFF

Philp Bourque, Detroit, Mich.

Application April 17, 1931. Serial No. 530,899

3 Claims. (Cl. 180—53)

My invention relates to a new and useful improvement in a power take off adapted for use primarily on motor trucks which are motor driven and from the drive shaft of which it is desired to transmit power to other devices for operation of the same.

It is an object of the present invention to provide an arrangement whereby the operation of the rear or driving wheels of the vehicle may be suspended when the pulley which serves as the power take off is being operated for power purposes.

To this end I provide a clutch, one section of which is constantly rotating while the engine is in operation, and it is an object of the present invention to provide a bearing for the driving shaft adjacent the clutch so as to form a rigid and durable construction.

It is another object of the invention to provide a particular form of mounting for the bearing of the drive shaft in which the bearing may be securely mounted on the oppositely positioned chassis rails of the vehicle.

Another object of the invention is the provision of a device of this kind in which the drive shaft is encased in a tube to connect the power take off pulley on the drive shaft at that portion which is usually encased in a housing, and at the same time to in no manner interfere with or minimize the reinforcing and stabilizing functions of the drive shaft or tube.

Another object of the invention is the provision in a device of this kind of a simple and effective mounting which may be easily and quickly installed, which will be economical of manufacture, which may be easily operated and which will be highly efficient in use.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central longitudinal sectional view of the invention, with parts shown in side elevation.

Fig. 2 is a sectional view taken on line 2—2 of Fig. 1.

Fig. 3 is a view taken on line 3—3 of Fig. 1.

Fig. 4 is a longitudinal central vertical sectional view of a modified form of the invention.

Fig. 5 is a sectional view taken on line 5—5 of Fig. 4.

In the drawing I have illustrated the invention used in connection with a mechanism having a transmission box 9 extending rearwardly from which is a drive shaft 10. Mounted fixedly on the drive shaft 10 is a pulley 11 which serves also as a clutch section and which is provided on its periphery with a plurality of V notches 12 for driving a V-belt which may be used therewith. As the description proceeds, however, it will be obvious that the pulley 11 may be of any desired type. Projecting outwardly from one face of the pulley 11 are studs 13, the purpose of which will appear later.

Mounted in the bore of the pulley 11 is a bearing 14 in which engages the reduced portion 15 of the drive shaft extension 16 which extends into the universal coupling housing 17 from which a rear drive shaft 18 extends. This coupling 17 is held in rigid position by its fastenings on the transverse bars 19 and 20 which connect to the oppositely disposed chassis rails 21 and 22.

Projecting outwardly from the bar 19 is a bracket 23 on which is rockably mounted the bell crank 24 carrying the forks 25 and 26 each of which is provided with a roller 27 engaging in the peripheral groove 28 formed on the clutch section 29 which is provided with the flat faced bore 79 in which engages the flat faced bushing 78 fixedly mounted on the shaft 16. The clutch section 29 is axially movable relatively to the shaft 16 and is provided on its face with pockets 30 for reception of the studs 13 so that when the section 29 is moved inwardly toward the pulley 11 which forms the other section of the clutch and the studs 13 are engaged in the recesses or pockets 30, the shaft 16 will rotate in unison with the shaft 10. A collar 31 is fixedly mounted on the shaft 10 adjacent the bearing housing 33 in which is positioned the bearing 32 for the shaft 10. This bearing housing is mounted upon the channel arm 34 which forms a transverse support extending from and connected at its opposite ends to the oppositely disposed chassis rails 21 and 22. A rod 80 is connected at one end to the bell crank 24 and at the other end to the lever 81 so that a rocking of the lever 81 will effect a movement of the clutch section 29 relatively to the section 11.

When it is desired to use the pulley as a power take off, the parts are moved to the position shown in Fig. 1, and when it is desired to drive the vehicle the clutch section 29 is moved to the position in which the studs 13 engage in the pockets or recesses 30.

The structure which I have described is one which may be easily and quickly mounted on a vehicle chassis and mounted in such a durable manner that efficient operation of the same at all times is assured and the necessary rigidity for operation of a device of this kind obtained.

In the form shown in Figs. 4 and 5, I have illustrated the invention used for a vehicle having a drive shaft 39 which extends rearwardly from the universal joint housing 37 and which is encased in a tube 38. This tube 38 is indicated as terminating in a bearing housing 40 in which is mounted the bearing 41 for the shaft 39. This bearing housing is enlarged and formed into a housing 42 which serves to enclose the take off pulley 11 which forms a part of the clutch and which co-operates with the clutch section 29 as described for the form in Fig. 1. This clutch section 29 is of the same structure as the clutch section 29 shown in Fig. 1 and is provided with pockets or recesses for accommodating the studs 13 which are fixedly mounted in the pulley 11. A disc 43 is formed integral with the tube 44 which encloses the extension 16' and which is secured to the tubular projection 45 which extends outwardly from the differential housing 46. The rollers 27 carried by the yoke arms 25 engage in the peripheral groove 28. Rockably mounted on the tube 44 is the lever 47 connected by the link 48 to the arm 49 from which project the yoke arms 25. A suitable rod 80' is connected to the lever 47 for effecting the rocking movement of this lever 47. It is thus seen that in a construction of this type I have interposed the power take off on a drive shaft which is encased in a tube and by my construction I in no manner interfere with the strength of the tube and the reinforcing characteristics thereof. This is accomplished by enlarging the tube at that portion where the take off pulley is located so as to maintain the original strength of the tube.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. In a construction of the class described adapted for use with a vehicle having a rearwardly extended drive shaft and a stationary tube enclosing said drive shaft, an enlargement on said tube; a bearing in said enlargement for supporting said shaft; a housing formed on said tube; a take-off pulley on said shaft within said housing; a disc attached to said housing; a tube extending rearwardly from said disc; an extension shaft projected through said last mentioned tube; and a clutch section mounted on said extension shaft and co-operating with said take off pulley for controlling the rotation of said extension shaft in unison with said pulley.

2. In a construction of the class described adapted for use with a vehicle having a rearwardly extending shaft, an extension shaft in alignment with said rearwardly extended shaft; a take off pulley mounted on said rearwardly extended shaft; a bearing for said rearwardly extended shaft adjacent said take off pulley; and a clutch section slidably mounted on said extension shaft and engageable with said take off pulley for effecting rotation of said extension shaft in unison with said pulley.

3. In a construction of the class described adapted for use with a vehicle having a rearwardly extending shaft; an extension shaft in alignment with said rearwardly extending shaft; a take off pulley mounted on said rearwardly extending shaft; a bearing for said rearwardly extending shaft adjacent said take off pulley; a bearing for the end of said extension shaft adjacent said pulley; and a clutch mechanism associated with said shafts and concentric of said pulley for effecting a rotation of said extension shaft in unison with said pulley.

PHILP BOURQUE.